United States Patent
Wozniak et al.

(10) Patent No.: US 11,915,872 B2
(45) Date of Patent: Feb. 27, 2024

(54) CERAMIC COMPONENT AND METHOD FOR PRODUCING THE CERAMIC COMPONENT

(71) Applicant: TDK Electronics AG, Munich (DE)

(72) Inventors: Uwe Wozniak, Deutschlandsberg (AT); Hermann Grünbichler, St. Josef (AT)

(73) Assignee: TDK Electronics AG, Munich (DE)

( * ) Notice: Subject to any disclaimer, the term of this patent is extended or adjusted under 35 U.S.C. 154(b) by 358 days.

(21) Appl. No.: 17/283,364

(22) PCT Filed: Apr. 24, 2020

(86) PCT No.: PCT/EP2020/061472
§ 371 (c)(1),
(2) Date: Apr. 7, 2021

(87) PCT Pub. No.: WO2020/224992
PCT Pub. Date: Nov. 12, 2020

(65) Prior Publication Data
US 2022/0005648 A1 Jan. 6, 2022

(30) Foreign Application Priority Data
May 8, 2019 (DE) ...................... 10 2019 111 989.8

(51) Int. Cl.
*C04B 35/465* (2006.01)
*C04B 35/447* (2006.01)
(Continued)

(52) U.S. Cl.
CPC ......... *H01G 4/1227* (2013.01); *C04B 35/447* (2013.01); *H01G 4/012* (2013.01);
(Continued)

(58) Field of Classification Search
CPC ... C04B 35/447; C04B 35/465; C04B 35/468; H01G 4/1227
See application file for complete search history.

(56) References Cited

U.S. PATENT DOCUMENTS 4,419,310 A 12/1983 Burn
4,781,859 A 11/1988 Noi
(Continued)

FOREIGN PATENT DOCUMENTS

CN 88102245 A 11/1988
CN 1148724 A 4/1997
(Continued)

OTHER PUBLICATIONS

International Search Report, with English translation, and Written Opinion of International Searching Authority corresponding to International Patent Application No. PCT/EP2020/061472, dated Sep. 18, 2020 (12 pages).

*Primary Examiner* — Karl E Group
(74) *Attorney, Agent, or Firm* — Nixon Peabody LLP

(57) ABSTRACT

A ceramic component having a ceramic main part containing $A_xB_yC_{1-x-v}Ti_{1-y+w}O_3*(Mn_2P_2O_7)_z*D_u$, in which A is a first dopant selected from a group including neodymium, praseodymium, cerium, and lanthanum, B is a second dopant selected from a group including niobium, tantalum, and vanadium, C is selected from a group including calcium, strontium, and barium, and D includes a metal selected from a group including aluminum, nickel, and iron. x is the proportion of A, y is the proportion of B, v is the proportion of A vacancies, w is the proportion of excess titanium, z is the proportion of Mn2P2O7, u is the proportion of D, and the following applies: $0.0 \leq x < 0.1$, $0.0 \leq y < 0.1$, $0 \leq v < 1.5*x$, $0 \leq w < 0.05$, $0.01 \leq z < 0.1$, $0 \leq u < 0.05$. A method for producing the ceramic component is also disclosed.

19 Claims, 1 Drawing Sheet

(51) Int. Cl.
*H01G 4/12* (2006.01)
*H01G 4/012* (2006.01)
*H01G 4/30* (2006.01)

(52) U.S. Cl.
CPC ....... *H01G 4/30* (2013.01); *C04B 2235/3208* (2013.01); *C04B 2235/3213* (2013.01); *C04B 2235/3215* (2013.01); *C04B 2235/3217* (2013.01); *C04B 2235/3227* (2013.01); *C04B 2235/3229* (2013.01); *C04B 2235/3232* (2013.01); *C04B 2235/3251* (2013.01); *C04B 2235/3262* (2013.01); *C04B 2235/3279* (2013.01); *C04B 2235/447* (2013.01); *C04B 2237/346* (2013.01)

(56) References Cited

U.S. PATENT DOCUMENTS

| | | | |
|---|---|---|---|
| 5,879,812 | A | 3/1999 | Nishiyama et al. |
| 2007/0253140 | A1 | 11/2007 | Randall |
| 2008/0115876 | A1 | 5/2008 | Komatsu |
| 2008/0117561 | A1 | 5/2008 | Tani |
| 2012/0019977 | A1 | 1/2012 | Kawamoto |
| 2013/0286541 | A1 | 10/2013 | Kawamoto |
| 2016/0071649 | A1 | 3/2016 | Yamazaki |
| 2017/0069427 | A1 | 3/2017 | Albertsen |

FOREIGN PATENT DOCUMENTS

| | | |
|---|---|---|
| CN | 1290942 A | 4/2001 |
| CN | 101137598 A | 3/2008 |
| CN | 105229762 A | 1/2016 |
| CN | 106165038 A | 11/2016 |
| DE | 112012000669 T5 | 10/2013 |
| DE | 112014002548 T5 | 3/2016 |
| EP | 0261419 A2 | 3/1988 |
| EP | 0288212 A1 | 10/1988 |
| EP | 1496030 B1 | 1/2005 |
| FR | 2799301 B1 | 4/2004 |
| JP | H07272973 A | 10/1995 |
| JP | 2000124058 A | 4/2000 |
| JP | 2012072033 A | 4/2012 |
| JP | 2015-141347 A | 8/2015 |
| WO | WO 2016/088675 A1 | 6/2016 |

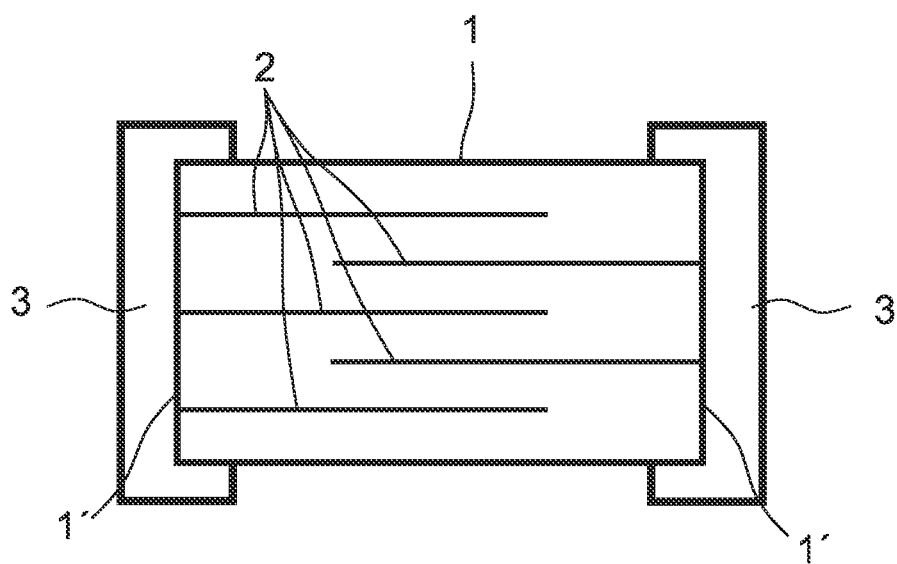

CERAMIC COMPONENT AND METHOD FOR PRODUCING THE CERAMIC COMPONENT

CROSS-REFERENCE TO RELATED APPLICATIONS

This application is a U.S. National Stage of International Application No. PCT/EP2020/061472, filed Apr. 24, 2020, which claims the benefit of German Patent Application No. 102019111989.8, filed May 8, 2019, both of which are incorporated herein by reference in their entireties.

FIELD

The invention relates to a ceramic component which comprises a ceramic base body comprising a ceramic material. The invention also relates to a method for producing the ceramic component.

BACKGROUND

Ceramic components are widely used parts for electronic components. In view of ever-increasing requirements with respect to the miniaturization and performance of the electronic structural parts, it is necessary to provide ever-smaller ceramic structural parts. A reduction in the size of the structural parts of the ceramic components, which are based on conventional ceramic materials, can however have a negative effect on electrical properties of the ceramic component, in particular. By way of example, it is thus possible for a size reduction of a capacitor, which is based on a conventional ceramic material, to result in an increase in sensitivity to electrostatic discharges (ESD) within the capacitor. An ESD can render the capacitor unusable.

A first example of a ceramic structural part according to the existing prior art is found in the document DE 11 2012 000 669 T5.

DE 11 2012 000 669 T5 describes a laminated semiconductor ceramic capacitor having a varistor function, and a method for the production thereof. In particular, What a $SrTiO_3$-based, grain-boundary-isolated semiconductor ceramic is disclosed for the varistor function. For one embodiment, DE 11 2012 000 669 T5 discloses that a dopant, which is selected inter alia from lanthanum, neodymium, niobium and tantalum, is added to the corresponding semiconductor ceramic.

A second example of a ceramic structural part according to the existing prior art is found in the document FR 2 799 301 B1.

FR 2 799 301 B1 describes a non-linear electrical resistor which can be used to protect an electrical power supply grid from electrical overvoltage, and also a method for producing such a non-linear electrical resistor. FR 2 799 301 B1 discloses that the non-linear electrical resistor comprises zinc oxide as the main constituent, and high-impedance layers are formed on the sides of the non-linear electrical resistor body. FR 2 799 301 B1 furthermore discloses that manganese pyrophosphate can be added to the non-linear electrical resistor.

SUMMARY

It is therefore an object of the present invention to provide a ceramic component which comprises a ceramic base body containing an improved ceramic material as the main constituent. It is also an object of the present invention to provide a method for producing the ceramic component.

Said objects are achieved by a ceramic component according to claim 1. Further embodiments of the ceramic component and method for producing the ceramic component can be derived from further claims.

What is provided is a ceramic component having a ceramic base body, wherein the ceramic base body contains a ceramic material as the main constituent that has the general empirical formula $A_xB_yC_{1-x-v}Ti_{1-y+w}O_3*(Mn_2P_2O_7)_z*D_u$. In the general empirical formula, A is a first doping which is selected from a group of first metals comprising neodymium, praseodymium, cerium and lanthanum. Further, B is a second doping which is selected from a group of second metals comprising niobium, tantalum and vanadium. Furthermore, C is a main constituent of a base ceramic material selected from a group of third metals comprising calcium, strontium and barium. In addition, D is an additive which comprises at least one first compound containing a fourth metal selected from a group of fourth metals comprising aluminum, nickel and iron. Furthermore, x is the molar proportion of A, y is the molar proportion of B, v is the molar proportion of A vacancies, w is the molar proportion of a titanium excess, z is the molar proportion of $Mn_2P_2O_7$ and u is the molar proportion of D. The following holds true for the molar proportions:

$0.0 \leq x < 0.1$,
$0.0 \leq y < 0.1$,
$0 \leq v < 1.5*x$,
$0.23 \ w < 0.05$,
$0.01 \leq z < 0.1$,
$0 \leq u < 0.05$.

Here and in the following text, a base compound with the general empirical formula $CTiO_3$ is to be understood as the base ceramic material, wherein C is a main constituent of the base ceramic material selected from the group of third metals.

Moreover, here and in the following text, a first metal which occupies lattice sites of a third metal in the crystal lattice of the base ceramic material is to be understood as a first doping.

Further, here and in the following text, a second metal which occupies titanium lattice sites in the crystal lattice of the base ceramic material is to be understood as a second doping.

In one embodiment of the ceramic material, the ceramic material comprises the base ceramic material including the first doping and the second doping, as well as at least one additive and manganese pyrophosphate with the empirical formula $Mn_2P_2O_7$.

The molar proportions of the first doping, the second doping and the additive can each also have a value of zero. In other words, the ceramic material can also contain, in addition to the base ceramic material, only the first doping or the second doping or the additive. Further, the ceramic material, in addition to the base ceramic material, can also contain only the first doping and the additive or only the second doping and the additive. Furthermore, the ceramic material can contain only the base ceramic material including the first and the second doping. In this case, the ceramic material does not contain any additive. In all the embodiments mentioned above, the ceramic material contains manganese pyrophosphate in a molar proportion of greater than zero. In other words, manganese pyrophosphate is always present in the ceramic material.

Further, the first doping can comprise at least two first metals, the second doping can comprise at least two second metals and the main constituent of the base ceramic material can comprise at least two third metals.

Furthermore, the additive can comprise at least one first compound and one second compound, each of which contains a fourth metal, wherein the first compound contains a fourth metal which differs from the fourth metal present in the second compound. In other words, the first compound contains a fourth metal which differs from that in the second compound. Metal oxides containing at least one fourth metal can be used as the first and second compound.

The ceramic material preferably comprises one of the compositions presented in Table 1 below.

Further, the ceramic component can be in the form of a capacitor. In particular, the ceramic component can be in the form of a multilayer capacitor. The multilayer capacitor has a ceramic base body with a multiplicity of ceramic layers and inner electrodes which are arranged between the ceramic layers. The inner electrodes preferably contain nickel.

The manganese pyrophosphate in the ceramic material makes it possible to obtain a densely sintered ceramic base body even at relatively low sintering temperatures of 1200° C. or less. Here and in the following text, a densely sintered

TABLE 1

$A_xB_yC_{1-x-y}Ti_{1-y+w}O_3 * (Mn_2P_2O_7)_z * D_u$

| | B | | C | | | | | D | | | |
|---|---|---|---|---|---|---|---|---|---|---|---|
| A | $B_1$ | $B_2$ | $C_1$ | $C_2$ | $C_3$ | Ti Coefficient | $Mn_2P_2O_7$ | D1 | D2 | | |
| x | $y_1$ | $y_2$ | | | | Element | z | $u_1$ | $u_2$ | v | w |
| La | Nb | Ta | Ba | Ca | Sr | Ti | | Al | Ni | | Ti |
| Example 1 | 0.02 | 0.00 | 0.00 | 0.194 | 0 | 0.776 | 1.000 | 0.01 | 0 | 0 | 0.010 | 0.000 |
| Example 2 | 0.00 | 0.01 | 0.01 | 0.193 | 0 | 0.772 | 0.990 | 0.02 | 0 | 0 | 0.035 | 0.015 |
| Example 3 | 0.04 | 0.00 | 0.00 | 0.0002 | 0 | 0.9498 | 1.000 | 0.01 | 0 | 0 | 0.010 | 0.000 |
| Example 4 | 0.02 | 0.01 | 0.02 | 0.0002 | 0.03 | 0.9198 | 0.970 | 0.01 | 0.02 | 0 | 0.030 | 0.000 |
| Example 5 | 0.00 | 0.01 | 0.01 | 0.193 | 0 | 0.772 | 0.995 | 0.02 | 0 | 0 | 0.035 | 0.015 |
| Example 6 | 0.02 | 0.00 | 0.00 | 0.191 | 0.02 | 0.764 | 0.985 | 0.01 | 0.01 | 0.02 | 0.035 | 0.015 |
| Example 7 | 0.04 | 0.01 | 0.01 | 0.0002 | 0 | 0.8798 | 0.980 | 0.02 | 0 | 0 | 0.020 | 0.000 |

In Table 1, $B_1$ is a second metal and $B_2$ is a further second metal which are present in the second doping B, wherein the coefficients $y_1$ and $y_2$ are the respective molar proportions of the second metals $B_1$ and $B_2$ in the second doping B. The sum of the coefficients $y_1$ and $y_2$ gives the molar proportion y of the second doping in the ceramic material.

Furthermore, $C_1$ is a third metal, $C_2$ is a further third metal and $C_3$ is an additional third metal which are present in the main constituent C of the base material. The values for $C_1$, $C_2$ and $C_3$ represent the molar proportion of the respective third metal in the main constituent C, wherein the sum of the values is 1.

Further, $D_1$ is a fourth metal and $D_2$ is a further fourth metal which are present in the additive D. The sum of the coefficients $u_1$ and $u_2$ gives the molar proportion u of the additive in the ceramic material.

It has to be mentioned that the molar proportions for the constituents of the ceramic material corresponding to Examples 1 to 7 as set out in Table 1 can each vary by up to 10%. It is thus possible, for example, for the molar proportion of the first doping x for Example 1 not only to have the value of 0.02. Rather, x can also have all values between 0.018 and 0.022. All other values for the respective molar proportions set out in Table 1 can analogously also vary by up to 10%. Advantageous molar proportions vary by up to 5% from the values specified in the table. By way of example, this means for the molar proportion of the first doping x in Example 1 that x can assume all values between 0.019 and 0.021.

Furthermore, the ceramic base body of the ceramic component can have a multiplicity of ceramic layers, which can be the same or different, and inner electrodes which are arranged between the ceramic layers, wherein the inner electrodes contain nickel as the main constituent.

ceramic base body should be understood to mean a base body which has a sintered density of 90% or more.

The inventors explain that the positive effect of the manganese pyrophosphate is due to the manganese pyrophosphate being a sintering aid, which melts congruently even at a temperature below 1100° C. under reducing conditions. What is meant by melting congruently is that the manganese pyrophosphate becomes completely liquid without decomposition at the stated melting point. This has the result that the melted manganese pyrophosphate is distributed homogeneously in the ceramic base body and thus leads to very homogeneous and high compaction of the ceramic base body.

The reduction in the sintering temperature by virtue of the manganese pyrophosphate makes it possible to control the grain growth when sintering the ceramic base body, as a result of which the electrical and mechanical properties of the ceramic base body are improved.

Furthermore, the reduced sintering temperature allows the use of nickel-containing inner electrodes, since these electrodes do not melt at the reduced sintering temperature. Since nickel is more cost-effective than the metals conventionally used for the inner electrodes, such as for example gold, silver or palladium, the costs for the ceramic structural part as a whole can be kept low.

Since the ceramic material can be a main constituent of a ceramic base body which is part of a capacitor, in particular of a multilayer capacitor, it is possible to provide a multilayer capacitor which, even in the case of a small capacitor size, is robust with respect to ESD and comprises Ni-containing inner electrodes. As a result, the multilayer capacitor is reliable and cost-effective.

A structure of type 0603 or smaller should be considered to be a small capacitor size. Furthermore, a capacitor which is hardly prone to undergo an ESD event is to be understood as a capacitor which has a structure of type 0603 or smaller, a capacitance of less than 10 nF and an ESD voltage of more than 8 kV. The capacitor which is robust with respect to ESD preferably has a capacitance of 1 nF and an ESD voltage of more than 20 kV. The ESD voltage is the particular voltage with which the structural part can be loaded without damaging it. The higher the ESD voltage, the greater the extent to which the structural part can be loaded without damage.

Further, the present invention specifies a method for producing a ceramic component. Said method comprises the following sub-steps:

providing a base ceramic material having the general empirical formula $CTiO_3$, wherein C is a main constituent of the base ceramic material comprising a third metal selected from a group of third metals comprising calcium, strontium, barium, adding $Mn_2P_2O_7$, a first dopant which contains a first metal and/or a second dopant which contains a second metal and/or a Ti-containing compound and/or an additive which comprises at least one first compound containing a fourth metal to the ceramic material, with subsequent mixing to obtain a mixture, wherein the first metal is selected from a group of first metals comprising neodymium, praseodymium, cerium and lanthanum, the second metal is selected from a group of second metals comprising niobium, tantalum and vanadium, the third metal is selected from a group of third metals comprising calcium, strontium and barium, and the fourth metal is selected from a group of fourth metals comprising aluminum, nickel and iron, grinding the mixture to obtain a ground mixture, producing ceramic green sheets from the ground mixture, applying inner electrodes to the ceramic green sheets, stacking the ceramic green sheets to obtain a stack of green sheets, pressing the stack of green sheets to obtain a pressed stack of green sheets, singulating the pressed stack to obtain singulated green structural parts, decarburizing the singulated structural parts to obtain decarburized structural parts, sintering the decarburized structural parts to obtain sintered structural parts, tempering the sintered structural parts to obtain ceramic base bodies, applying metallizations to and firing metallizations on outer surfaces of the ceramic base bodies to obtain ceramic components.

Here and in the following text, what is intended to be considered as the first dopant is a substance which contains at least one first metal which is a constituent part of the first doping.

Here and in the following text, what is intended to be considered as the second dopant is a substance which contains at least one second metal which is a constituent part of the second doping.

At least one oxide of a first metal can be used as the first dopant, wherein the first metal is selected from the group of first metals.

At least one oxide of a second metal can be used as the second dopant, wherein the second metal is selected from the group of the second metals.

Further, a first and/or a second dopant can be added to the base ceramic material, wherein the first dopant contains at least two first metals and the second dopant contains at least two second metals. In other words, the first dopant comprises at least one constituent which contains at least two different first metals. The first dopant can preferably contain a first constituent and a second constituent, wherein the first constituent contains a first metal which differs from the first metal present in the second constituent. Analogous considerations apply to the second dopant, wherein second metals are present instead of first metals.

Further, the main constituent of the base ceramic material can comprise at least two third metals.

In addition, an additive comprising at least aluminum and nickel can be added to the base ceramic material. In other words, the additive can comprise a first compound which contains at least aluminum and nickel. The additive can preferably comprise a first compound and a second compound, wherein the first compound contains nickel and the second compound contains aluminum, or vice versa.

Further, a metal-containing paste containing nickel can be used for applying the inner electrodes.

In addition, the decarburized stack of green sheets can be sintered at a temperature of between 1200 and 1250° C. and for a holding time of one to five hours. The decarburized stack of green sheets is preferably sintered for four hours either at 1200° C., 1250° C. or at a temperature in between.

In one preferred embodiment of the method for producing the ceramic component, the decarburized stack of green sheets can be sintered in a reducing atmosphere. Here and in the following text, a reducing atmosphere should be an atmosphere which prevents oxidation of the ceramic material and of the nickel inner electrodes, in particular by the atmospheric oxygen.

In addition, the tempering can be carried out in air in order to reoxidize the sintered structural part. This step makes it possible, for example in the case of a capacitor, to set electrical properties of the capacitor, such as the robustness of the capacitor with respect to an ESD.

Further, a passivation of glass can be applied to the ceramic base body. The passivation protects the ceramic base body from external influences such as moisture or temperature fluctuations.

The invention will be described in more detail below on the basis of an exemplary embodiment with the associated FIGURE.

BRIEF DESCRIPTION OF DRAWINGS

FIGURE shows a ceramic component having a ceramic base body.

The FIGURE and the size ratios in the FIGURE are not true to scale.

DETAILED DESCRIPTION

FIGURE shows a ceramic component having a ceramic base body 1 with internal inner electrodes 2 and two metallizations 3, which are attached to two opposite outer surfaces 1' of the ceramic base body 1. In addition, the ceramic base body 1 has a passivation 4 of glass. The ceramic component is in the form of a multilayer capacitor. The ceramic base body contains, as the main constituent, a ceramic material with the empirical formula $La_{0.2}Ba_{0.194}Sr_{0.776}Ti_1O_3*(Mn_2P_2O_7)_{0.01}$ and thus corresponds to the composition of the first example shown in Table 1.

A base ceramic material with the empirical formula $Ba_{0.2}Sr_{0.8}TiO_3$ was provided for the production of a ceramic base body for an exemplary embodiment. Lanthanum oxide as the first dopant, titanium dioxide as the titanium-containing compound, and manganese pyrophosphate were added to the base ceramic material. The sum of the molar proportions of the base ceramic material, the first dopant, the titanium-containing compound and the manganese pyrophosphate is 100 mol %. Thus, the molar proportion of the base compound is 97 mol %, the molar proportion of the first dopant is 1 mol %, the molar proportion of the titanium-containing compound is 1.5 mol % and the molar proportion of manganese pyrophosphate is 0.5 mol %. Subsequently, the base ceramic material, the first dopant, the titanium-containing compound and the manganese pyrophosphate were mixed together and ground to obtain a ground mixture.

From the ground mixture ceramic green sheets were produced, to which inner electrodes were applied by means of a metal-containing paste containing nickel. In a subsequent step, the printed green sheets were stacked to form a stack of green sheets and were pressed to obtain a pressed stack of green sheets. After this, the pressed stack of green sheets was singulated and then the singulated structural parts were decarburized at 600° C. and sintered at 1250° C. for four hours in a reducing atmosphere in order to obtain a ceramic base body 1. In a further step, metallizations 3 were applied to two opposite outer surfaces 1' of the ceramic base body 1. Finally, the ceramic base body 1 was subjected to a passivation 4 of glass.

The invention is not restricted to the above exemplary embodiment. In particular, the ceramic material can comprise a composition corresponding to Examples 2 to 7 from Table 1. The ceramic material can, however, also comprise a composition which differs from the compositions shown in Examples 1 to 7 in Table 1, Examples 1 to 7 being considered to be preferred. The use of the ceramic material is also not restricted to a capacitor.

LIST OF REFERENCE DESIGNATIONS

1 Ceramic base body
1' Outer surface
2 Inner electrodes
3 Outer metallization
4 Passivation

The invention claimed is:

1. A ceramic component having a ceramic base body, which as the main constituent comprises a ceramic material having the empirical formula $A_xB_yC_{1-x-v}Ti_{1-y+w}O_3*(Mn_2P_2O_7)_z*D_u$, wherein
A is a first doping which is selected from a group of first metals comprising neodymium, praseodymium, cerium and lanthanum,
B is a second doping which is selected from a group of second metals comprising niobium, tantalum and vanadium,
C is a main constituent of a base ceramic material selected from a group of third metals comprising calcium, strontium and barium
and D is an additive which comprises at least one first compound containing a fourth metal selected from a group of fourth metals comprising aluminum, nickel and iron,
wherein x is the molar proportion of A, y is the molar proportion of B, v is the molar proportion of A vacancies, w is the molar proportion of a titanium excess, z is the molar proportion of $Mn_2P_2O_7$, u is the molar proportion of D and the following holds true for the molar proportions:
$0.0 \leq x < 0.1$,
$0.0 \leq y < 0.1$,
$0 \leq v < 1.5*x$,
$0 \leq w < 0.05$,
$0.01 \leq z < 0.1$,
$0 \leq u < 0.05$.

2. The ceramic component as claimed in claim 1, wherein the first doping comprises at least two first metals and/or the second doping comprises at least two second metals and/or the main constituent of the base ceramic material comprises at least two third metals.

3. The ceramic component as claimed in claim 1, wherein the additive comprises at least one first compound and one second compound, each of which contains a fourth metal, wherein the first compound contains a fourth metal which differs from the fourth metal present in the second compound.

4. The ceramic component as claimed in claim 1, wherein the ceramic base body has a multiplicity of ceramic layers and inner electrodes which are arranged between the ceramic layers, wherein the inner electrodes contain nickel as the main constituent.

5. The ceramic component as claimed in claim 1, wherein the ceramic component is a capacitor.

6. The ceramic component as claimed in claim 1, wherein the ceramic base body has a sintered density of more than 90%.

7. A method for producing a ceramic component as claimed in claim 1,
wherein the method has the following sub-steps:
providing a base ceramic material having the empirical formula $CTiO_3$, wherein C is a main constituent of the base ceramic material comprising a third metal selected from a group of third metals comprising calcium, strontium, barium,
adding $Mn_2P_2O_7$, a first dopant which contains a first metal and/or a second dopant which contains a second metal and/or a Ti-containing compound and/or an additive which comprises at least one first compound containing a fourth metal to the ceramic material, with subsequent mixing to obtain a mixture,
wherein the first metal is selected from a group of first metals comprising neodymium, praseodymium, cerium and lanthanum, the second metal is selected from a group of second metals comprising niobium, tantalum and vanadium, the third metal is selected from a group of third metals comprising calcium, strontium and barium, and the fourth metal is selected from a group of fourth metals comprising aluminum, nickel and iron,
grinding the mixture to obtain a ground mixture,
producing ceramic green sheets from the ground mixture,
applying inner electrodes to the ceramic green sheets,
stacking the ceramic green sheets to obtain a stack of green sheets,
pressing the stack of green sheets to obtain a pressed stack of green sheets,
singulating the pressed stack to obtain singulated green structural parts,
decarburizing the singulated structural parts to obtain decarburized structural parts,
sintering the decarburized structural parts to obtain sintered structural parts,
tempering the sintered structural parts to obtain ceramic base bodies,
applying metallizations to and firing metallizations on outer surfaces of the ceramic base bodies to obtain ceramic components.

8. The method as claimed in claim 7, wherein the main constituent of the base ceramic material comprises at least two third metals.

9. The method as claimed in claim 7, wherein the first dopant contains at least two first metals and/or the second dopant contains at least two second metals.

10. The method as claimed in claim 7, wherein additives comprising at least aluminium and nickel are added.

11. The method as claimed in claim 7, wherein a metal-containing paste containing nickel is used for applying the inner electrodes.

12. The method as claimed in claim 7, wherein the decarburized stack of green sheets is sintered at a temperature of between 1200 and 1250° C. and for a holding time of one to five hours.

13. The method as claimed in claim 7, wherein the decarburized stack of green sheets is sintered in a reducing atmosphere.

14. The method as claimed in claim 7, wherein a passivation of glass is applied to the ceramic base body.

15. The ceramic component as claimed in claim 5, which has a structure of type 0603 or smaller.

16. The ceramic component as claimed in claim 5, wherein the capacitor has a capacity smaller or equal to 10 nF.

17. The ceramic component as claimed in claim 5, wherein the capacitor has an ESD-voltage of above 8 kV.

18. The ceramic component as claimed in claim 1, wherein a passivation of glass is attached to the ceramic base body.

19. The method as claimed in claim 7, wherein the tempering is carried out in air.

* * * * *